3 Sheets—Sheet 1.
H. C. JOHNSON.
Apparatus for Aging Whisky and other Spirits.
No. 196,094. Patented Oct. 16, 1877.
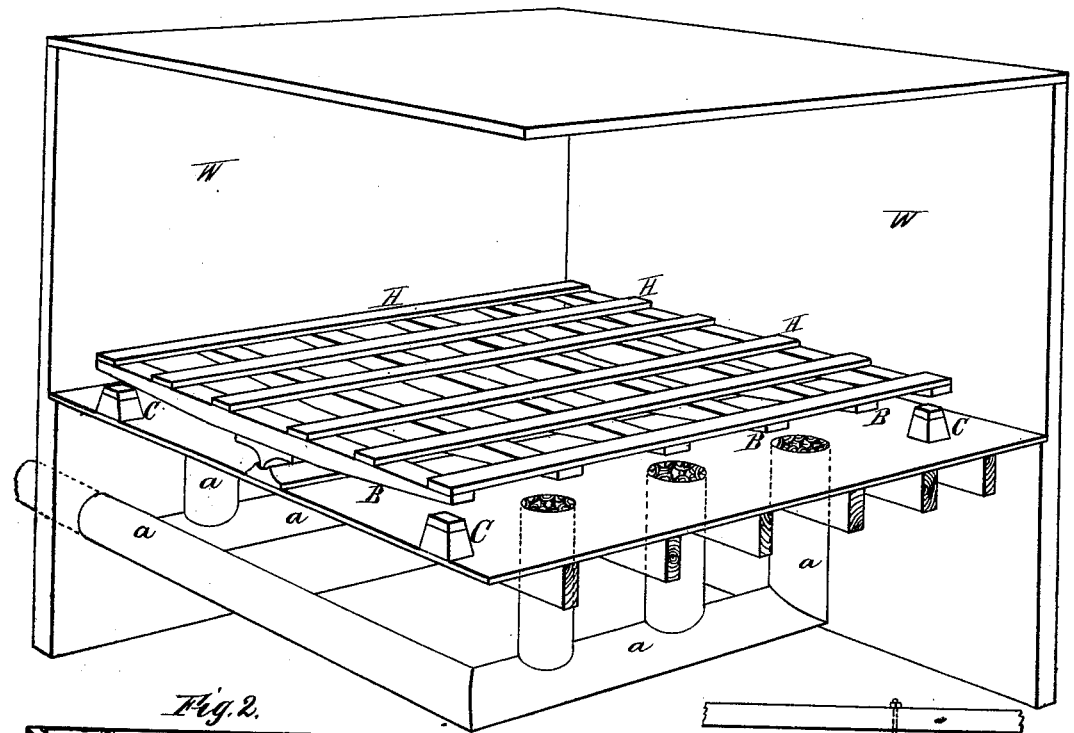
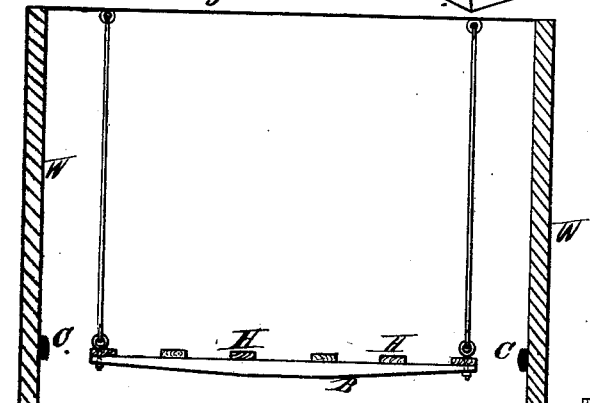
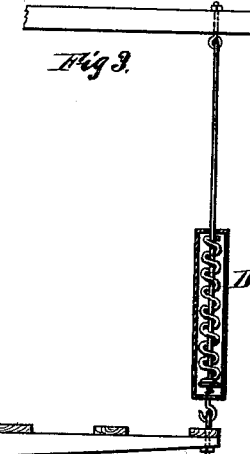
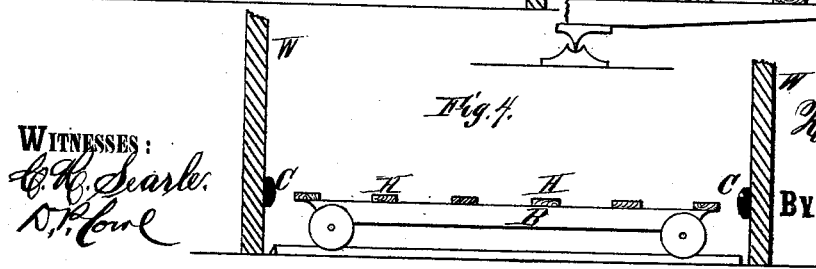
WITNESSES:
C. H. Searle.
D. P. Lowe
Henry C. Johnson,
INVENTOR:
BY North Osgood,
ATTORNEY.

3 Sheets—Sheet 2.
H. C. JOHNSON.
Apparatus for Aging Whisky and other Spirits.
No. 196,094. Patented Oct. 16, 1877.
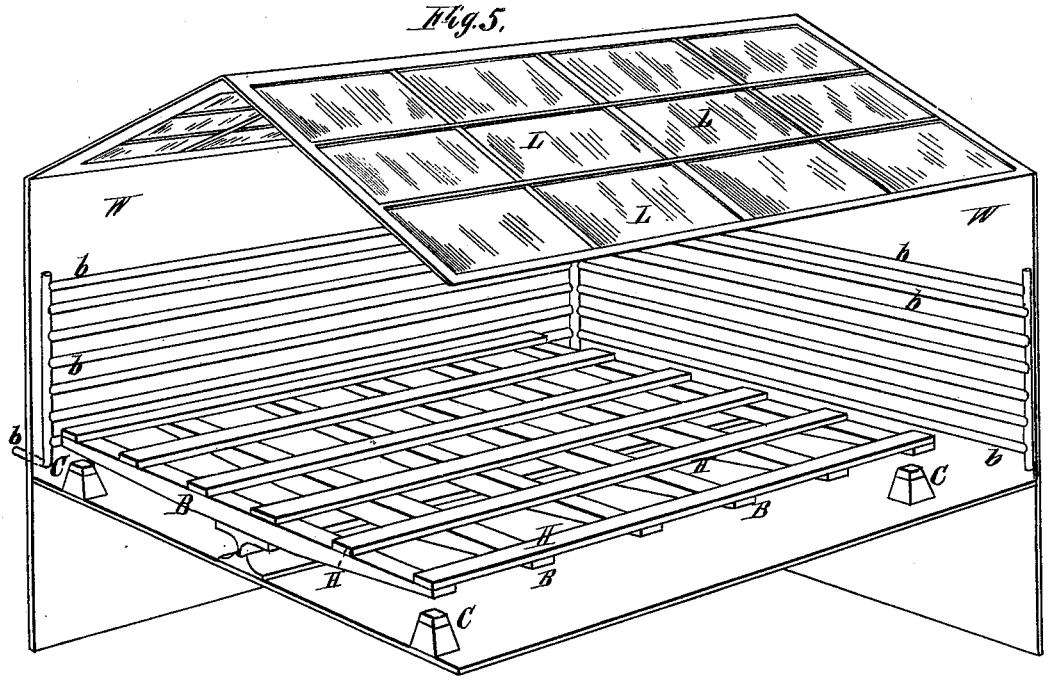
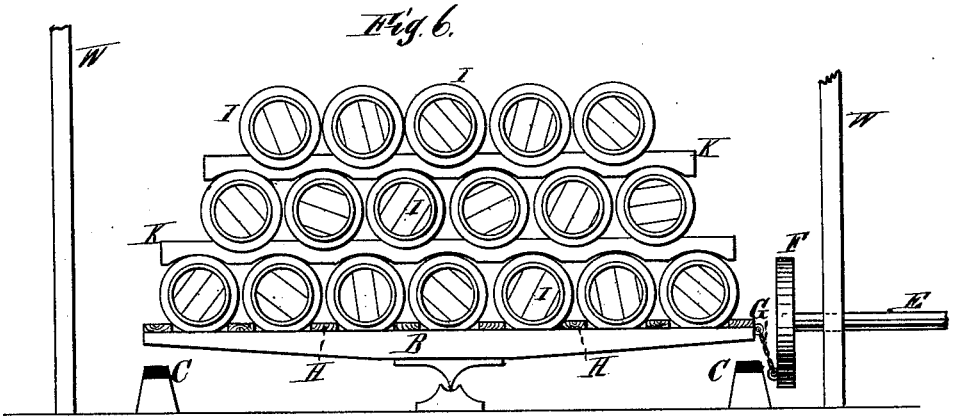
WITNESSES:
Chas. H. Searle.
D. P. Cowl
Henry C. Johnson,
INVENTOR:
By Worth Osgood
ATTORNEY.

3 Sheets—Sheet 3.
H. C. JOHNSON.
Apparatus for Aging Whisky and other Spirits.
No. 196,094. Patented Oct. 16, 1877.
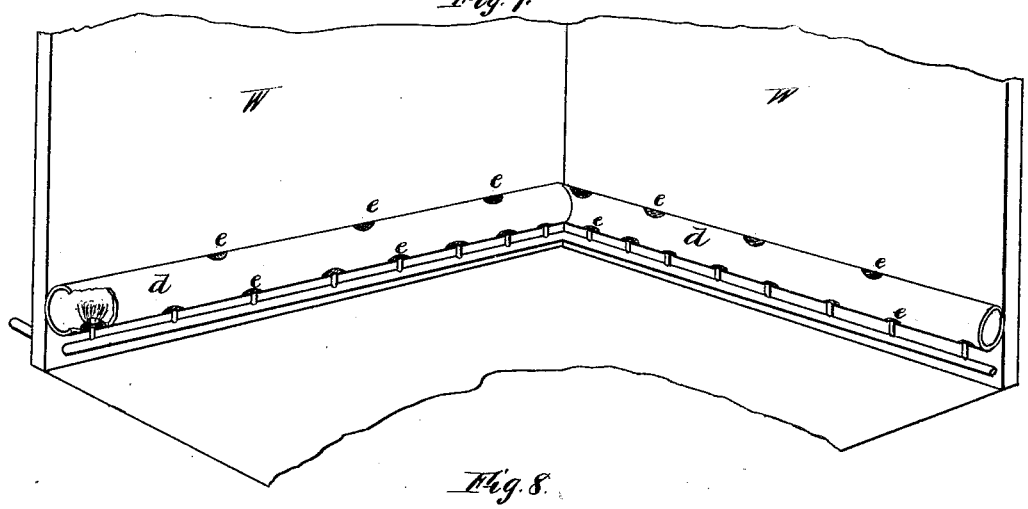
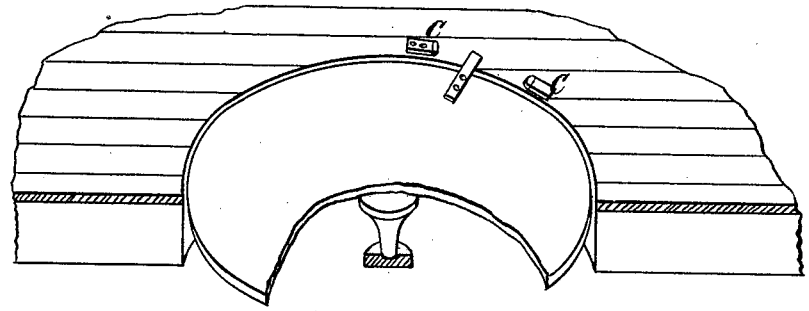
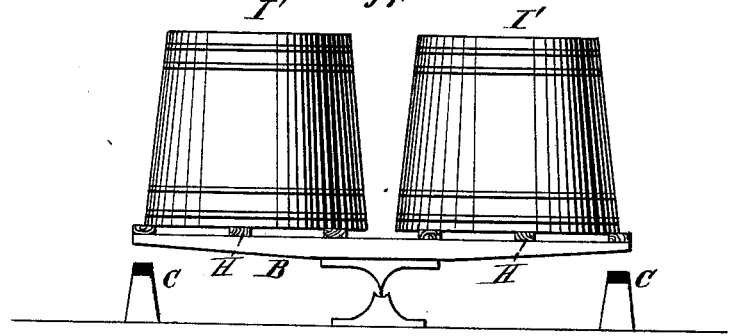
WITNESSES:
Chas. H. Searle.
D. P. Cowl
Henry C. Johnson,
INVENTOR:
BY North Osgood
ATTORNEY.

UNITED STATES PATENT OFFICE.

HENRY C. JOHNSON, OF MEADVILLE, PENNSYLVANIA.

IMPROVEMENT IN APPARATUS FOR AGING WHISKY AND OTHER SPIRITS.

Specification forming part of Letters Patent No. 196,094, dated October 16, 1877; application filed September 22, 1877.

*To all whom it may concern:*

Be it known that I, HENRY C. JOHNSON, of Meadville, county of Crawford, and State of Pennsylvania, have invented certain new and useful Improvements in Apparatus for Aging Whisky and other Spirits, of which the following is a full, clear, and exact description, reference being had to the accompanying drawings, and to the letters of reference marked thereon.

Figure 1 is a perspective view of a portion of a closed room having an agitating apparatus mounted therein in accordance with my invention, and showing also the preferred arrangement of hot-air pipes. Fig. 2 is a sectional elevation, illustrating the platform as suspended from above, showing the location of the spring-bumpers; Fig. 3, a similar view, illustrating a modified form of bumper adapted to be used in connection with a platform supported similarly to that shown in Fig. 1; and Fig. 4 is still another sectional elevation, representing the platform as mounted upon a horizontal track, with the bumpers placed at the end of its path. Fig. 5 is a perspective view, showing the walls of metal, the roof of glass panes, and the method of heating by use of hot water. Fig. 6 is an elevation of a loaded platform, showing one method of coupling the moving-power thereto. Fig. 7 is a perspective, representing the arrangement and construction of heating-drums adapted to be used in connection with a supply of gas or oil; and Fig. 8, a similar view of a portion of a platform mounted upon a central pivot, and having a reciprocating motion in a horizontal plane. Fig. 9 is an elevation of a modified form of cask, two or more of which may be placed upon the platform.

Like letters in all the figures indicate corresponding parts.

The object of my invention is to produce an apparatus by means of which the spirits may be more thoroughly agitated during the process of "aging" than has heretofore been done, and to improve upon the arrangement of the heating apparatus, so that the room which contains the original casks upon the agitators may be uniformly and thoroughly heated without the necessity of opening the warehouse.

To accomplish all of this the invention consists in certain peculiarities of construction and arrangements of parts, as will be hereinafter first fully described, and then pointed out in the claims.

All aging apparatus which do not involve the process of rectifying, and which admit of manipulation of the liquors in the original casks, are constructed to imitate the agitation produced on board of sea-going vessels. By agitation the vaporization and oxidation of fusel-oil contained in new whiskies and analogous liquors is hastened, especially when accomplished in the presence of heat.

I have conceived that the removal of this deleterious substance is not alone all that is required to give the liquor that peculiar and agreeable smoothness produced by long standing, or after the lapse of a certain time, but that some new molecular arrangement or disturbance of the particles is essential.

To produce this I propose to construct the agitating apparatus in such manner that the motion thereof shall be suddenly arrested, whereby a more thorough agitation is secured, and the sudden overcoming of the inertia of the several particles causes them to return one upon the other, and thus facilitates the desired new molecular arrangement.

Heretofore the agitators of this class have been so arranged as that only a gentle vibratory or reciprocating motion has been communicated to the casks, affording scarcely any possibility of changing the upper surface of the liquid, and, practically, no stirring up of the particles with respect to each other.

In the device herein illustrated, chosen to represent the principles of the invention, the casks I I I, &c., are mounted upon any suitable platform, to which motion is communicated by any known means, as water-power, steam, or animal power, or that of any other character.

Near the extremity of the path of the platform I place bumpers, or such other obstruction as will suddenly arrest the motion of said platform. If the obstruction be so made as that the platform will be forced to recoil a short distance, the desired agitation will be more effectually communicated, and for this reason I prefer to employ rubber or other elastic springs, as shown at C, against which the timbers of the platform may abut. The same effect may be produced by employing a rope or chain suspended from above, and having a spring, as D, interposed between its extremities, to the lower one of which the timbers are suitably connected. The operation of this spring is sufficiently obvious, and need not herein be detailed.

The platform may be made to rotate, to oscillate as a pendulum, to move upon a horizontal track or way, or have any desired motion, so far as this bumping or sudden arresting is concerned; but it being desirable that very little power be required to do the necessary work, I propose and prefer to place the platform upon a knife-edge, and to balance the weight as nearly as possible. This form is plainly indicated in Figs. 1, 3, 5, 6, and 9, and it is apparent that the expenditure of very little power will be ample to tip the platform from one side to the other. For the purpose of conveniently balancing the mass upon both sides of the knife-edge, a movable weight may be attached to the timbers, or either end of the platform may be loaded, as desired.

It is believed that a shock communicated once in two or three minutes will be sufficient to produce the desired results, and the simplest means which I have been able to devise for the purpose of operating this particular style of balanced platform is represented at Fig. 6, wherein E is the slowly-moving driving-shaft, which projects without the aging-room, and is coupled with the driving-power, (of whatever nature that may be,) located outside of said room. The disk F is connected with the timbers of the movable platform in such manner as to cause the same to rock back and forth as the shaft moves in the one direction, and also so as to admit of the recoil after the system is arrested by the bumpers. The chain or other flexible coupling G will accomplish the desired results. I will here state, however, that the peculiar manner of producing the movement in the platform is no essential part of my invention, since that movement may be produced by any known mechanical means. The platform may, for all purposes of the invention, be mounted upon a central pivot, and receive a partially-rotating motion thereon, as indicated in Fig. 8, being arrested by the bumpers, as in the other figures showing modified forms of the platform, or rather modified means of supporting the same.

A convenient method of mounting the original casks upon the platform is shown at Fig. 6, wherein B B are the main timbers. H H are cross-pieces laid thereon, and serving as chucks for the casks I I. Upon the top of the lower rows of casks I place the barrel-rests K K, hollowed out upon both faces to fit upon the casks below, and to receive a second row above. In this manner the number of barrels may be increased in proportion to the strength of the platform; and it will be observed that the system is thereby firmly bound together, so that the shock will have little or no effect in disarranging the casks or destroying or damaging the cooperage.

Upon either form of platform, instead of mounting the original casks, it may be desirable, under some circumstances, to mount large tanks or tubs, as at I' I', &c., and to place the liquor to be aged in these. Under this arrangement a more extended surface is exposed to the surrounding atmosphere, and the process would doubtless be thereby accomplished more speedily, but the advantage of manipulating the liquor in the original casks would be sacrificed.

This advantage is based entirely upon the governmental regulation that liquors in bond are required to be left undisturbed in their original vessels, and in view of this requirement the process could not be made available during the time the liquor remained in bond, if it be essential that it be drawn off or otherwise disturbed. The casks I' I' will be found advantageous when the liquor is simply remaining in the store-house or after the government duty has been paid and the liquor released.

A heat of about 110° Fahrenheit is judged to be about the proper degree necessary to the successful operation of the process. To communicate this with as little expense as possible, and so that it may be regulated without the necessity of entering the room, as well as that it shall be thoroughly and evenly distributed therein, I propose to employ some one of the following modes:

If it be preferable to use hot air, the furnace is located at some convenient point outside of the room, and provided with a suitable number of conducting-pipes, a a, &c., entering the room at various points, either through the floor or through the side walls; or, if it be required to heat the room, not by discharging hot air therein, but by carrying the same through in closed pipes, then a suitable number of these are located at the requisite distances from each other, having communication with the furnace, which is, as before, located outside of the room or warehouse. Hot water may be employed in substantially the same manner, the conducting-pipes b b, Fig. 5, being suitably disposed about the walls of the room.

If the apparatus be located in a district wherein coal-gas is manufactured, heating-drums d d may be distributed throughout the room, and the heat supplied by means of this gas. This arrangement may be advisable, since it will not necessitate the constant care of an attendant, being made to operate continuously under an automatic supply of fuel. So, also, with the use of oils, such as petroleum and gasoline. In summer-time these unusual modes of heating may be advantageously employed, since they admit of an instantaneous arresting of the consumption of fuel which a wood or coal burning heater does not permit.

If a flame be lighted in the aging-room, care should be taken to protect the same by wire-gauze or equivalent material, as e, inserted in the opening through which the necessary supply of oxygen is admitted to the drum, and also at the point whence the products of combustion are discharged, because the room becomes filled with a gas evolved from the liquors, and danger from fire might otherwise result.

In order to utilize the heat from the sun, it is proposed to make the walls W of iron or metal, and to insert glass panes L in the roof. Under this construction very little artificial heat will be required during the heated term. The room being closed, the air therein will be heated to about the required degree, and thus considerable economy effected.

If a simple water-power be employed—as, for instance, one which will load and unload the ends of the platform by discharging a quantity of water into suitably-valved tanks thereon—the requisite continuous motion may be communicated to the platform without requiring the services of any attendant, and this throughout the whole term necessary to effect the purposes of the invention. This term is variously estimated at from four to twelve weeks.

The spring-bumpers hereinbefore mentioned are preferred to any other means of arresting the platform, also, because, by their use too severe a shock to the timbers and the barrels thereon is avoided, and any liability to breakage or damage to either is obviated.

When constructed in accordance with the several principles enunciated, the improved apparatus is extremely simple and cheap, and may be operated with very little outlay for heat-power and attendance, as compared with previous forms, which do not afford the requisite amount of agitation. Since the improved apparatus is also not liable to get out of order, and inasmuch as the heat and power are conveyed from points without the aging-room, the machine may be continuously operated without breaking the seal of the warehouse, and with tolerable certainty that no damage shall occur during the aging period.

As before intimated, I am aware of numerous devices calculated to produce motion in the liquor-casks without the presence of heat; and I am also aware that an attempt has been made to heat the aging-room by means of a stove located therein. This method of heating is impracticable for the purposes intended, mainly because of the danger to be apprehended from the use of a stove in the room wherein the gases are evolved, as before explained, and because the room cannot, by its use, be thoroughly and uniformly heated, and cannot be kept closed, as is in some cases required. I am further aware of the use of steam-pipes running under the platform. To these forms I desire it understood that I lay no claim; but,

Having thus fully described my invention, what I do claim as new, and desire to secure by Letters Patent, is—

1. In an apparatus for aging liquors, the combination, with a movable platform, of a bumper or other obstruction placed in the line of its travel, for the purpose of suddenly arresting its motion, substantially as set forth.

2. In an apparatus for aging liquors, the combination, with a movable platform, of a series of spring or other elastic bumpers, substantially as set forth.

3. In an apparatus for aging liquors, a movable platform for supporting the casks, the same being mounted upon or combined with a knife-edge support, and operating substantially as herein explained.

4. In apparatus for aging liquors, a movable platform supporting the casks and receiving motion from a power located without the aging-room, a closed room having metallic walls, and a heating apparatus, also located without the room, but connected therewith by a series of pipes which distribute the heat uniformly, the several parts being combined and arranged substantially as hereinbefore set forth.

5. In apparatus for aging liquor, a closed room having metallic walls and glass roof, and a movable support for the casks, located within such rooms, the whole combined and arranged substantially as shown and described.

6. In an apparatus for aging liquors, a movable platform for supporting the casks, and a series of pipes arranged to distribute hot air to suitable register-openings in the walls or floor of the room containing said platform, said pipes leading from a hot-air furnace located outside of the walls of the room, the whole arranged and operating substantially as explained.

In testimony that I claim the foregoing I have hereunto set my hand in the presence of two witnesses.

HENRY C. JOHNSON.

Witnesses:
SAMUEL McDONALD,
ALBERT MILLER.